United States Patent [19]

Yunoki

[11] Patent Number: 5,379,383

[45] Date of Patent: Jan. 3, 1995

[54] COMMUNICATION SERVICE CONTROL SYSTEM IN AN INTELLIGENT NETWORK PROVIDING CONTROLLERS FOR CONTROLLING DIFFERENT SERVICES

[75] Inventor: Hideo Yunoki, Kawasaki, Japan

[73] Assignee: Fujitsu Limited, Kawasaki, Japan

[21] Appl. No.: 745,388

[22] Filed: Aug. 15, 1991

[30] Foreign Application Priority Data

Aug. 15, 1990 [JP] Japan .................. 2-215499

[51] Int. Cl.$^6$ .................. G06F 13/00; H04M 3/00
[52] U.S. Cl. .................. 395/325; 395/200; 379/242
[58] Field of Search ............... 395/325, 275, 200, 700, 395/650; 379/242, 243, 244, 258

[56] References Cited

U.S. PATENT DOCUMENTS

| | | | |
|---|---|---|---|
| 4,919,545 | 4/1990 | Yu | 380/25 |
| 4,979,118 | 12/1990 | Kheradpir | 364/436 |
| 5,105,438 | 4/1992 | Ackroff et al. | 375/8 |
| 5,123,089 | 6/1992 | Beilinski et al. | 395/200 |
| 5,153,884 | 10/1992 | Lucak et al. | 371/32 |
| 5,206,901 | 4/1993 | Harlow et al. | 379/211 |
| 5,212,727 | 5/1993 | Ramkumar | 379/221 |
| 5,247,571 | 9/1993 | Kay et al. | 379/207 |
| 5,251,255 | 10/1993 | Epley | 379/242 |

*Primary Examiner*—Jack B. Harvey
*Assistant Examiner*—Glenn A. Auve
*Attorney, Agent, or Firm*—Staas & Halsey

[57] ABSTRACT

A user sends a service request to an SCP through an SSF. Then, the SCP (Service Central Point) receives the service request through the SSF (Service Switching Function) interface and issues a request of a service to the application controller. The application controller obtains from the service applicator the specification data corresponding to the kind of service contained in the service request, and then sends them to the software component controller. The software component controller obtains the software component according to the software component number contained in the specification data, and then returns it to the application controller. Then, the software component controller checks whether or not the software component is available for the specified kind of service, and returns the software component only when it is available. When it is not available, the application controller is notified. The application controller analyzes the software component or a message returned by the software component controller, then calls a new software component or sends a message to the SSF through the SSF interface.

9 Claims, 6 Drawing Sheets

AP - CTL ORDER SLIP

SC - CTL ORDER SLIP

00 : NEXT SC ACTIVATION
      REQUEST
01 : SSE MSG SENDING
      REQUEST
10 : RESERVE
11 : RESERVE

COMMUNICATION SERVICE CONTROL SYSTEM IN AN INTELLIGENT NETWORK PROVIDING CONTROLLERS FOR CONTROLLING DIFFERENT SERVICES

BACKGROUND OF THE INVENTION

2. Field of the Invention

The present invention relates to an SCP (Service Control Point) service control system in an intelligent network where a user can optionally receive various services by providing a controller for controlling each service and a switch-controller for controlling a switching function, each being operated independently.

2. Description of the Related Art

Recently, a concept of "an intelligent network (hereinafter referred to as an IN)" has been suggested and developed as a new network concept in the field of network technology. The IN permits a user to optionally receive various services by providing a controller for controlling each service and a switch-controller for controlling a switching function, each being operated independently.

FIG. 1 shows a basic configuration of a conventional IN.

As shown in FIG. 1, an intelligent network (IN) comprises a node which has a switch-controlling function and is called a service switching point SSP (or a service switching function SSF) 100 and a node which contains information (knowledge) for realizing various kinds of services and is called a service control point SCP (or a service control function SCF) 110. Such structure that the communication between these nodes is performed using a common line signal system 120 has been proposed.

The SCP 110 controls all services of a switching device. The SSP 100 transmits the content of a service requested by the sending side to the SCP 110. On receiving this request, the SCP 110 generates control information for realizing a requested service and sends a reply to the SSP 100. Receiving the control information, the SSP 100 performs control of switching for the line connected to a terminal (or a relay) 130 such as a phone. As described above, a service can be realized using a relatively simple function.

Thus, various services can be managed centrally by allowing an SCP to have all functions relating to service control, and a user can further add and modify services.

At present, the CCITT and other organizations are making a study as to what control method should be used for such a basic configuration. However, a decision has not been made yet. It has been suggested that an application service should be realized by the combined use of a plurality of software parts. However, an appropriate method of realizing the service control has not been suggested yet.

As described above, in the prior art technology, there are no appropriate service control methods for a service control point SCP in an intelligent network.

If an IN in a basic configuration is realized, non-standard parts (specific parts to each service)in addition to standard parts (commonly used in every service) must be included in a number of software parts. Appropriate methods of controlling the non-standard parts and of registering them as standard parts in the future must be suggested concretely. However, at present, a necessary technique is not established.

SUMMARY OF THE INVENTION

An object of the present invention is to provide a service control method for a service control point SCP, required for executing an application in an intelligent network.

As the first unit, an SSF interface is included in an SCP as an interface to a service switching function SSF connected through a communication line.

As the second unit, also in the SCP, a service applicator (service AP) for holding the specification of each service provided in the service request information from the SSF is included. The service applicator AP comprises a service specification table for each service for prescribing a service specification for each service request from the SSF, identifies each service, and obtains the corresponding service specification table.

As the third unit, in the SCP, an application controller for obtaining specification data of the corresponding service from the service applicator described above is included. That is, specification data can be obtained from the corresponding service specification table. The specification data contains the data indicating the sequence of small scale formatted processes for performing a requested service.

As the fourth unit, also in the SCP, a software component part for storing a plurality of software parts for executing the determined small-scale formatted processes is included. The requested service can be executed by operating the software parts in the order specified by the application controller described above.

As the fifth unit, in the SCP, a software component controller for obtaining from the software component part the software component corresponding to the specification data specified by the application controller and then sending them back to the application controller is included. The software component controller comprises a software component management table for managing an access to the software component part and a software component administrator for managing a software component management table. The software component management table contains data indicating the availability of each software component for the corresponding service.

According to the configuration of the present invention described above, an application service can be made only by combining and describing software components. The initial IN can be easily migrated to the completely standardized IN by giving usage restrictions on software components. In the initial IN, standard software components and specific software components to each service (including software components not complete and reliable yet) co-exist.

BRIEF DESCRIPTION OF THE DRAWINGS

The objects and features of the present invention are clearly described in attached drawings and embodiments.

FIG. 1 shows a basic configuration of an IN;

DESCRIPTION OF THE PREFERRED EMBODIMENTS

Figure 1:
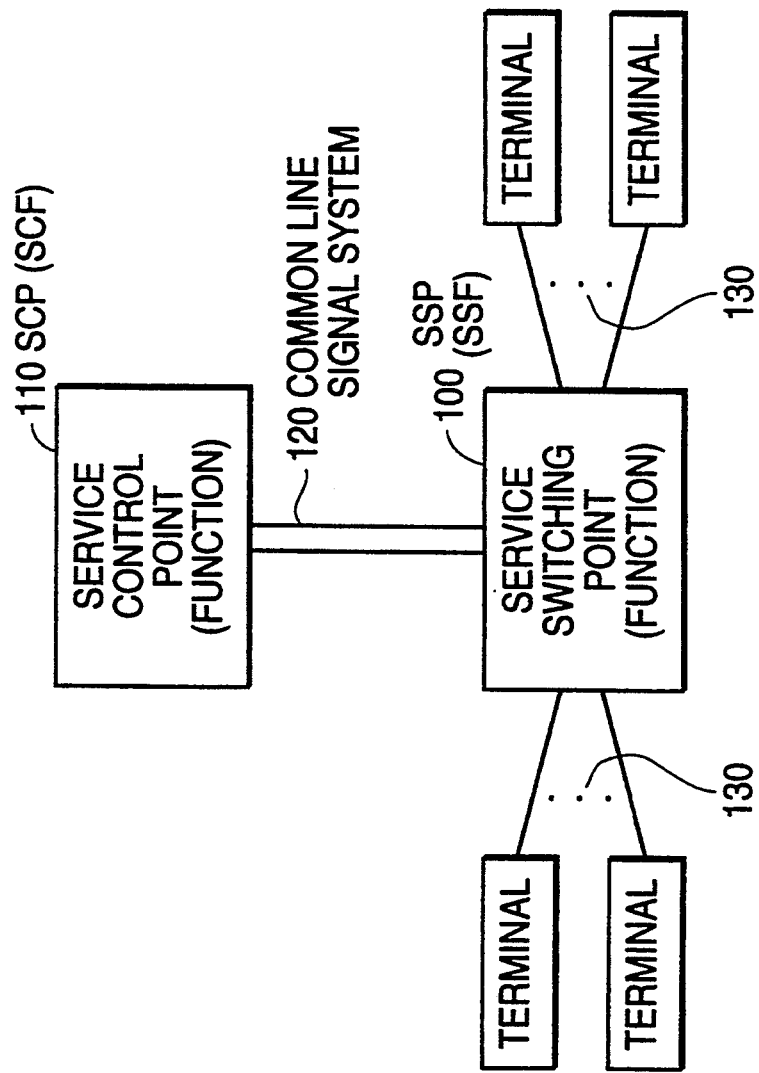
Figure 2:
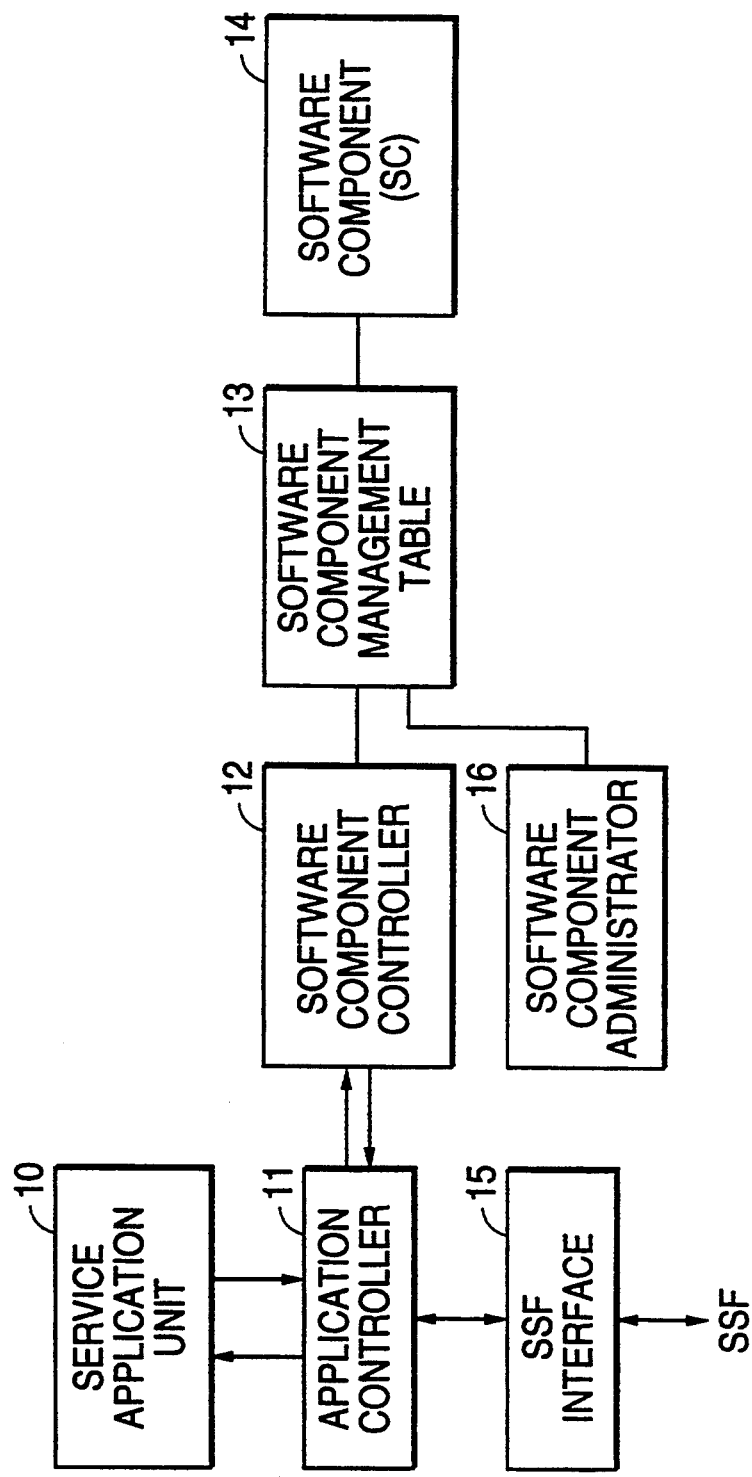
FIG. 2 shows a principle configuration of the present invention.

FIG. 2 shows a principle configuration of the present invention. An object of the present invention is to realize a requested service control by sequentially obtaining software components (SC) necessary for each service in response to a service request from an SSF, checking the existence of usage restrictions on each SC and the usage restrictions of each SC corresponding to each service, sending information to the SSF according to the content of an obtained SC, and obtaining the next SC.

First, an SSF interface 15 provided in SCP establishes an interface for the SSF. As the SSF and the SCP are connected through a communication process using the common line signalling method, signal data sent from the SSF is converted to data to be used in the SCP, and the data generated in the SCP internally is converted to a signal in the common line signalling method.

An application controller 11 provided in the SCP receives a service request signal from the SSF which is sent through the SSF interface 15, analyzes the received signal, and then accesses a service applicator 10 which will be described later. The application controller 11 sends software parts for executing a service request generated in the SCP to the SSF through the SSF interface 15.

On the other hand, the service application unit 10 contains a table which prescribes software components (SC) for providing a service, retrieves the table by accessing using a service key from the application controller, and then sends a software component identifying number (SC number) to the application controller 11.

In a software component part 14 provided in the SCP, software components (SC) are stored according to each software component number.

In addition, in a software component management table 13 provided in the SCP, the restriction information for indicating the availability of each SC for all services or for a part of services is stored. The information is stored in a table with SC numbers as a key. In the software component management table 13, the location of each software component in the software component part 14 is stored as a pointer.

Furthermore, in a software component controller 12 in the SCP, an access is performed to an actual software component (SC). Then, the software component controller 12 accesses a software component management table 13 using an SC number as a key, checks restriction information, accesses, if possible, the software component 14 using a pointer, and obtains software component.

Finally, in a software component administrator 16, in response to a user's request, a software component is registered, and the restriction information of a software component is set.

The principle of the above operational configuration is described as follows:

First, the SSF sends a service request from a terminal, etc. to the SSF interface 15 in the SCP using the common signal line method. The SSF interface 15 activates the application controller 11 using the requested service key (representing the kind of service) and the related data. The application controller 11 accesses the service applicator 10 using the service key.

In the service applicator 10, each specification necessary for providing each service is set correspondingly. Each specification comprises a series of data (including an SC number) for providing the corresponding service. One series of corresponding specification data (SC number, etc.) is outputted using a service key requested by the application controller 11.

On receiving the specification data, the application controller 11 issues an instruction to the software component controller 12 using an SC number in the specification data. The software component controller 12 can directly access the software component part 14 to obtain a necessary SC. However, it usually accesses, using an SC number, the software component management table 13 provided to perform a restriction control on each SC.

The restriction information is written in the software component management table 13 as to whether or not all SCs corresponding to respective SC numbers are available, whether or not only certain services are available, etc. The software component controller 12 accesses the software component management table 13, by using the SC number and checks the existence of the restrictions as referring to the restriction information. If possible, the corresponding software component (SC) is obtained from the software component part 14 using a pointer written in the table. The obtained data is sent to the application controller 11 through the software component controller 12.

In the application controller 11, the received data is sent to the SSF interface 15 if it is to be used in the SSF according to the kind of data, and then sent from the SSF interface 15 to the SSF. On the other hand, if the received data is to be used for obtaining the next software component, an access is made to the service applicator 10, or any other action is taken.

When a command to restrict a registration of a software component or an access thereto is received from a user or an administrator, the software component administrator 16 is activated, and data for the registration or restriction is set.

An embodiment of the present invention is described below in association with drawings.

Figure 3:
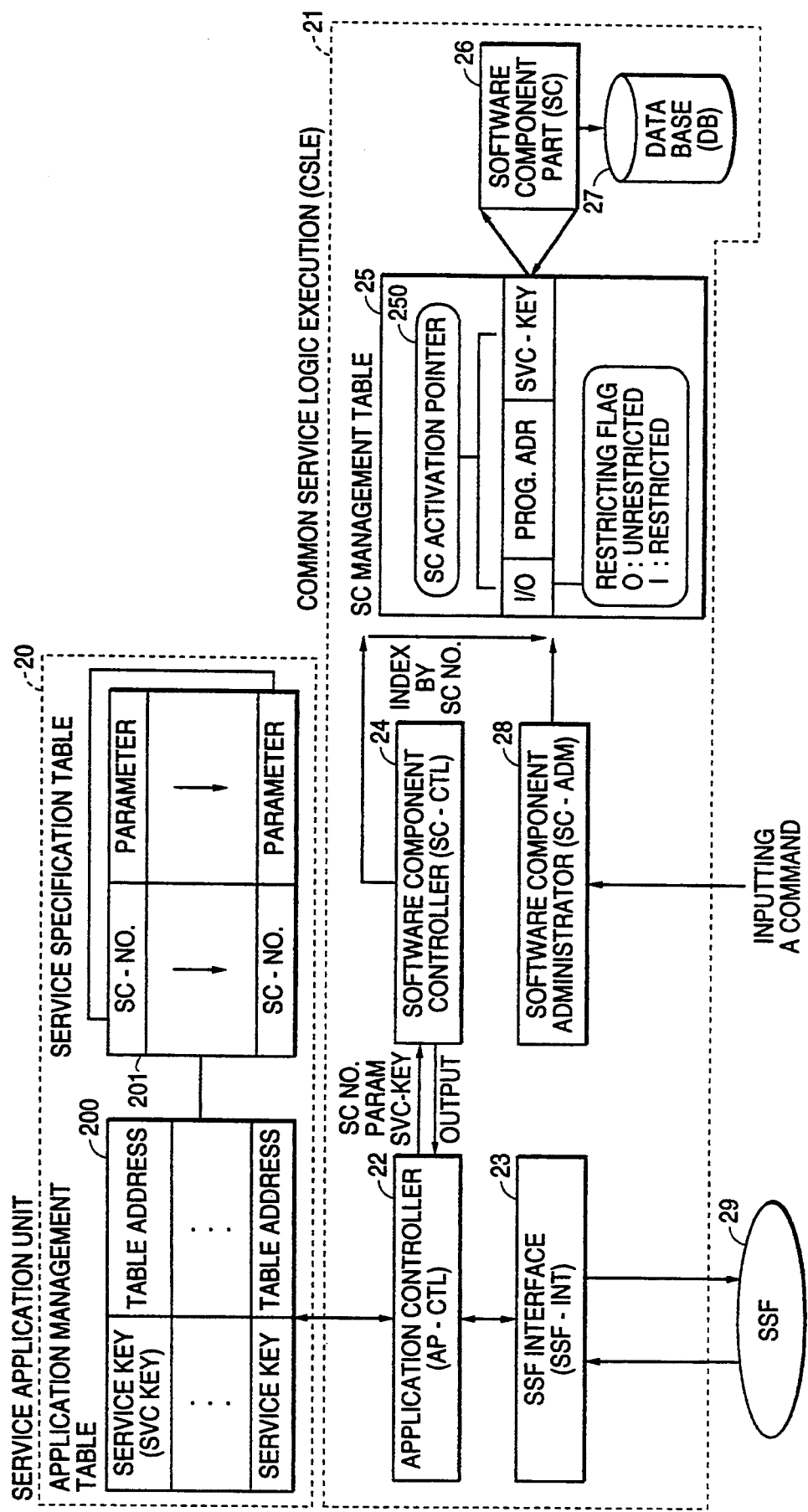
FIG. 3 shows a configuration of an embodiment of the present invention.

FIG. 3 shows a configuration of an embodiment of the present invention.

The embodiment comprises a service applicator unit 20 and a common service logic execution (CSLE) 21 for realizing the parts other than the service applicator 10 shown in the principle configuration in FIG. 2. Actually, the service applicator 20 can be realized by a memory such as a RAM, etc.; the CSLE 21 can be realized by a memory of a CPU and a RAM, etc., and a storage of the DASD. etc.

First, the service application unit 20 comprises an application management table 200 containing addresses in a service specification table corresponding to each service key. The service specification table 201 corresponding to each service key is stored at each address stored in the application management table 200. In the service specification table 201, a plurality of service component numbers (SC numbers) and parameters (data used for a process of each service component) are stored.

The CSLE 21 comprises an application controller (AP-CTL)21, an SSF interface (SSF-INT) 23, a software component controller (SC-CTL) 24, a software component administrator (SC-ACM) 28, an SC management table 25, a software component part (SC) 26, and a data base (DB) 27. An AP-CTL 22, an SSF-INT 23, an SC-CTL 24, and an SC administrator 28 can be realized as programs to be executed by a CPU. An SC management table 25 can be realized as a table in a memory such as a RAM, etc. Additionally, a software component part 26 can be realized in a memory such as a RAM, etc. A data base 27 is used when data is generated during the processing of the software component part 26, and realized in a storage such as a DASD, etc. and in a memory such as a RAM, etc.

Next, the operation of the configuration of the above described embodiment is described.

First, when a service activation message is issued from an SSF 29, the SSF-INT 23 of the CSLE 21 receives it. The message includes the necessary information to determine a specific service key. The typical examples of this information are access number, trigger points, calling party number and so on.

The SSF-INT 23 provides the AP-CTL22 with this message request. The AP-CTL 22 sends an activation request to the AP 20 according to the service key (SVC-KEY). The service AP20 determines the address in the service specification table (TBL-ADR) of the target AP after searching the application management table 200. According to the thus obtained address, the service specification table 201 is read, and the content is sent back to the AP-CTL 22 through a transaction.

Software component numbers (SC numbers) for the services requested using a service key and an input parameter for the corresponding SC (a service key, number information, the modality of the bearer such as voice or packet, etc.) are stored sequentially in the service specification table 201. According to this information, subsequent accesses and processes are performed to each software component (and associated parameter).

For example, using an SC number and a parameter of a service specification table 201, actions can be taken in response to various requests such as "Connect", "Reply", "Monitor an event" and "Merge a plurality of callings".

The AP-CTL22 prepares an order slip to sequentially execute software components in a transaction, and requests the SC controller 24 to take an action. The order is issued for each SC in the service specification table 201.

Figure 4A:
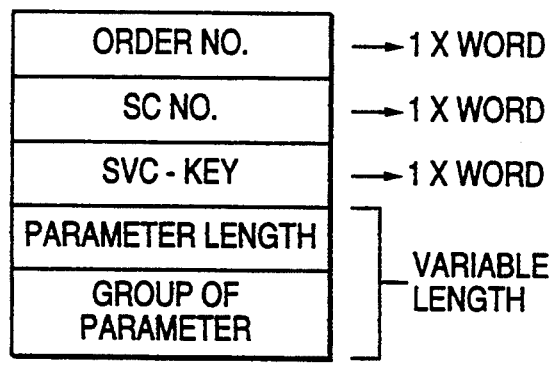
FIGS. 4A and 4B respectively show AP-CTL order slip and SC-CTL order slip.
Figure 4B:
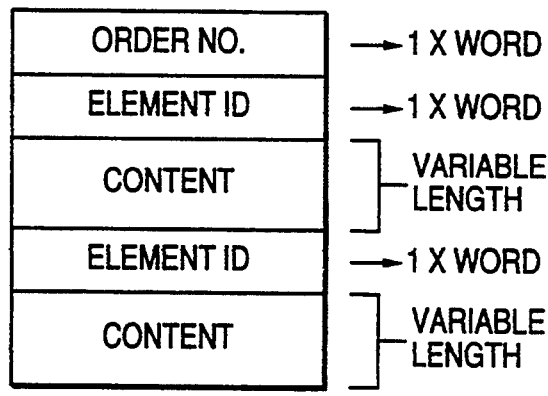

FIGS. 4A and 4B shows a configuration of an order slip. FIG. 4A shows a configuration of an AP-CTL order slip to be issued from the AP-CTL22 to the SC controller.

The order slip contains an order number (NO) at the head, followed by an SC number, a service key (SVC-KEY), and the parameter length and a series of parameters for storing parameters obtained from the service specification table 201 sequentially, and parameters can be variable in length.

On receiving the order, the SC-CTL 24 interprets the meaning of the instruction according to the order number, indexes the SC number table 25 according to the SC number (accesses to the position of the SC number from the leading address), extracts the SC activation pointer (SC ACT POINTER) 250 stored therein, and performs the following processes.

First, a restriction flag of the pointer 250 is checked. The flag contains a value "1" or "0". As the value 1 indicates that the corresponding SC is in the temporary disabled state, the process in progress is interrupted and a rejection response is sent back to the SC-CTL24. The value "0" indicates that the corresponding SC is not in the disabled state. This case, however, the corresponding software component can be either a standard SC (available to all services) or a non-standard SC (available only to specific services).

Therefore, the content of the SVC-KEY of the SC activation pointer 250 is checked. That is, it is checked whether or not a service key (SVC-KEY) is registered in the pointer. If yes, only the registered services can use the corresponding SC. This case, it is checked whether or not the service key (for showing the kind of service request) in the above described order slip matches with the SVC-KEY registered in the SC activation pointer 250. If yes, the corresponding SC is activated. If the SVC-KEY of the SC activation pointer is not registered (the values are all "1"), the SC is determined to be a standard software component, and is activated.

An SC can be activated by a jump to the program address (PROG. ADR) in an SC activation pointer, when a series of parameters in the above described slip are passed as an input to the SC part 26.

The SC part 26 stores software procedures for performing formatted processes by programs at the destination of the jumps. A jump executes a target process of the corresponding component while accessing a data base (DB) 27, anti returns the result to the SC-CTL 24.

Suppose, as an example of the SC part 26, one calling group comprises A, B, and C being connected to one another, and the other calling group comprises D, E, and F being connected to one another; where, these two calling groups are merged to conduct a conference communication among six members. The state of legs associated with these two calling groups (access interfaces associated with these calling groups) and of connection points (connection points of callers) is checked. If the information is stored in the data base 27 (where all information relating to the state is stored), data is read automatically in the SC part 26. The check of the state relating to the access interface specified as the input information is performed also in the SC part 26. Thus, the AP side that requests the activation of the SC part 26 can obtain the finally required output results only by setting the input information for specifying an SC.

Next, the SC-CTL24 returns the output result to the AP-CTL 22 according to the SC-CTL order slip.

FIG. 4B shows a configuration of an SC-CTL, order slip.

Figure 6:
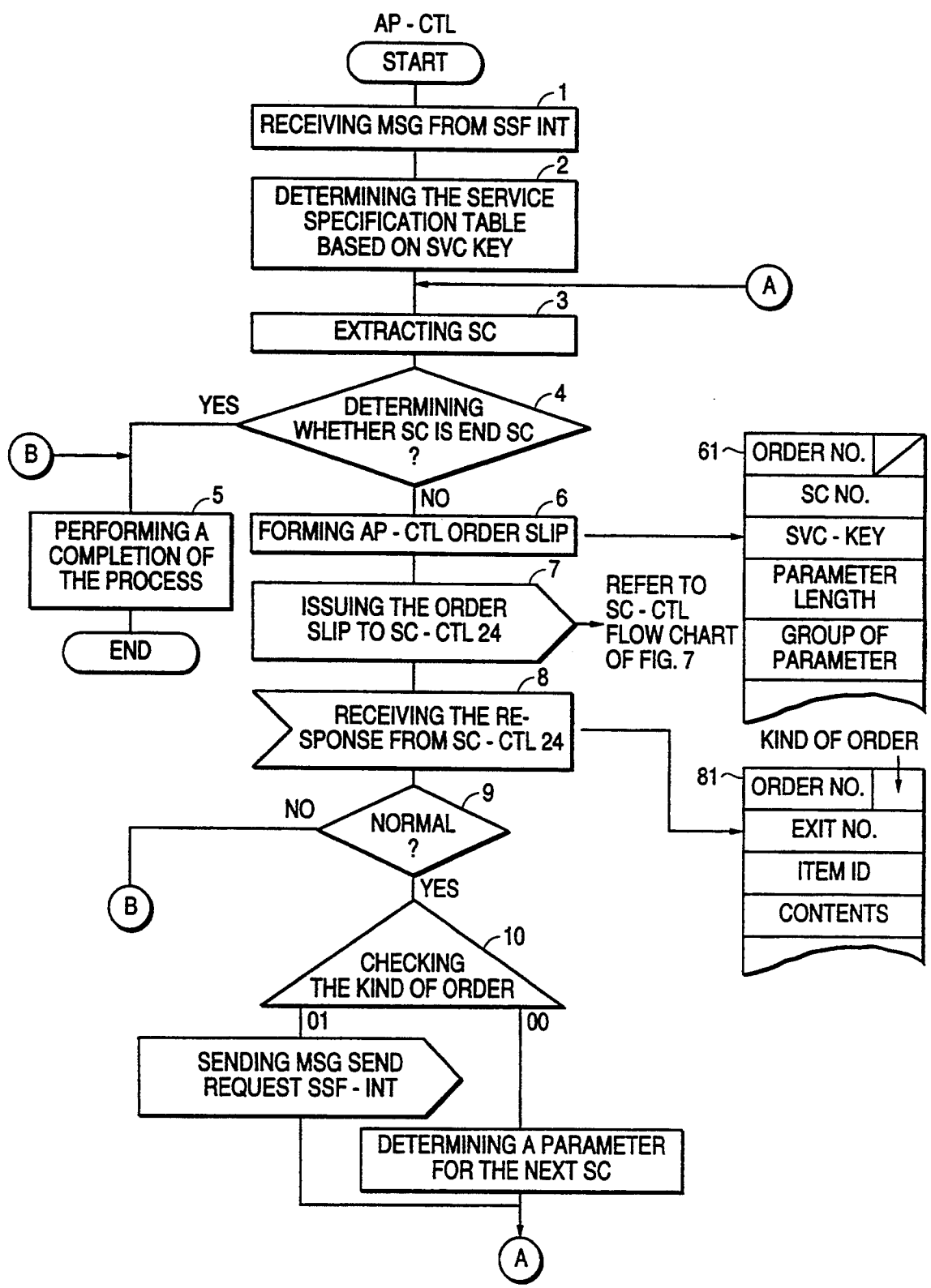
FIG. 6 shows a flow chart of an operation of AP-CTL.

The slip contains an order number at the head, followed by an item identification (ID), content (parameter), item ID and content (parameter). The slip may be formed such that it contains an order number at the head, followed by Exit No. item ID and its contents as shown in FIG. 6.

An order number indicates an instruction to the AP-CTL 22 according to its value. For example, an instruction requests to "Activate the next SC in the sequence using the parameter in the slip", "Output a message implied in this parameter to SSF 29x", etc.

Next, an element ID shows the kind of information of the subsequent contents (parameters). For example, it includes the content of a sending message to the SSF 29, the content of subscribers' data, the content of the DB (data base) relating to services, the traffic state, the number of transactions simultaneously using the corresponding SC, etc. The content shows a main body of data indicated by the element ID.

First, the AP-CTL 22 checks the content received in the above described SC-CTL order slip. If the message is to be sent to the SSF29, it is passed to the SSF-INT 23. Other contents are either treated in the AP-CTL 22 according to each element or used as a parameter for executing the next software component.

By repeating the above described processes, software components are sequentially executed to realize a requested service.

Next, the registration process of a software component (SC) is described.

The registration process of a software component can be activated by a command. If an administrator or a user of an IN requests to add a new SC, the registration process is executed by inputting a command through physical media such as a workstation, etc. When a software component (SC) administrator 28 of the CSLE 21 receives a command, the SC administrator 28 registers an SC number in the SC management table 25 (the contents such as a program address, etc. are stored at the position specified by the corresponding number).

The following is an example of a command.
REG SC—NO (SVC—KEY)/
When "SVC-KEY" is skipped, the SC is assumed to be registered as a standard SC.

Next, an access restriction to a software component (SC) is described.

The SC-CTL 24 restricts access to an SC using a command by an administrator.

In the process, the SC administrator 28 sets a restriction flag in the SC management table 25. The following is an example of a command.

RES SC—NO

The restriction process can be performed dynamically by the SC-CTL 24 for the purpose of a temporary restriction when an abnormal condition arises, e.g., when an SC falls in the congestion or it should be replaced.

An embodiment shown in FIG. 3 is explained in more detail.

Service specification table 201 comprises a plurality of SCs. The service programming is performed sequentially according to the SC number on the table. Two kinds of parameters are defined upon defining an SC. The first parameter is called a static parameter and is set upon defining an SC and comprises fixed data including an integer number, indicating the number of repetitions of a process, and the name of a data base. The second parameter is called a dynamic parameter and is further divided into two kinds. The first kind of dynamic parameter uses a content of an element ID included in a message content received from the SSF as a parameter. The element ID includes information collected by SSF, such as a transmission number, receipt number and feature key. The second dynamic parameter uses the output content from SC which is executed immediately before the present SC as an input parameter to the present SC. Suppose that the personal ID is detected by searching the data base of the SC executed immediately before. Then the personal ID number forms an input to the present SC. In this case, as the parameter of the present SC, the immediately previous SC NO. and an element ID corresponding to the personal ID are defined. A sequence of an execution of SC's is controlled by defining EXIT in SC and defining next SC NO. for respective EXITs of SC.

SC 1: Parameters / Element ID1 / Element ID2,
   EXIT 1: SC 5,
   EXIT 2: SC 2
SC 2: Parameters / Personal ID,
   EXIT 1: SC 10
   EXIT 2: SC 3

Application control unit (AP-CTL) 22 performs an order transmission. When a service specification determined AP-CTL 22 cooperates with SC-CTL 24 to sequentially execute SC defined in the service specification table. AP-CTL 22 obtains SC 1 and the parameters accompanied with SC 1 and issues an AP-CTL order to SC-CTL 24 as shown in FIG. 4A.

ORDER NO.
SC NO.
SVC-KEY
PARAMETERS

Figure 5:
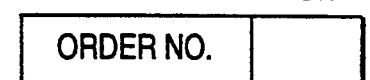
FIG. 5 shows a configuration of the order slip.

ORDER NO. comprises one word and has the lower two bits vacant. The lower two bits comprise reserve bits for use in the SC-CTL order. The order no. is used to establish consistency between transmission/response slips when the AP-CTL 22 cooperates with the SC-CTL 24. The order no. is associated with the service specification table 201 which is currently being executed. When software component control unit (SC-CTL) 24 receives an AP-CTL slip the SC management table is indexed by SC NO., thereby determining the SC to be activated. The element ID is provided to the output of the activated SC, thereby forming the SC-CTL order slip. In this case, the SC-CTL 24 uses as the order no. the same number as the AP-CTL order NO. and determines the following information by using the lower two bits as shown in FIG. 5.

ORDER NO.
EXIT NO. Newly Added
ELEMENT ID
CONTENT
ELEMENT ID
CONTENT

When the application control unit (AP-CTL) 22 receives the SC-CTL order response, it checks the order number and determines the service specification table associated with the order number and checks the lower two bits, thereby recognizing the order kind.

In case of the NEXT SC activation request, the SC number to be activated next based on the EXIT NO. is determined and is activated. In this case, the element ID and the content are provided to the next SC as a parameter. When the next SC is the end SC, the AP-CTL 22 determines that the process is completed and performs a completion operation and releases the related transactions. In the case of an SSF MSG transmission request, the AP-CTL 22 provides the transmission message content to the SSF-INT together with the element ID and the SSF-INT 23 normalizes the received content into a format of SS 7 TCAP and transmits the message.

FIG. 6 shows a flowchart of an operation of the AP-CTL 22. At step 1, it receives the MSG from the SSF INT. Step 2 determines the service specification table based on the SVC KEY. Step 3 extracts the SC. Step 4 determines whether the SC is the end SC. When the SC is the end SC, step 5 performs a completion of the process. When at step 4 the SC is not the end SC, step 6 forms the AP-CTL order slip 61. Step 7 issues the order slip to the SC-CTL 24. Step 8 receives the response from the SC-CTL 24 by using the SC-CTL order slip 81. At step 9 it is determined whether the response is normal. When the response is not normal, the process is completed at step 5. When the response is normal, step 10 checks the kind of order. In case of bits 01, the MSG SEND request is sent to the SSF-INT. In case of bit 00, a parameter for the next SC is determined.

Figure 7:
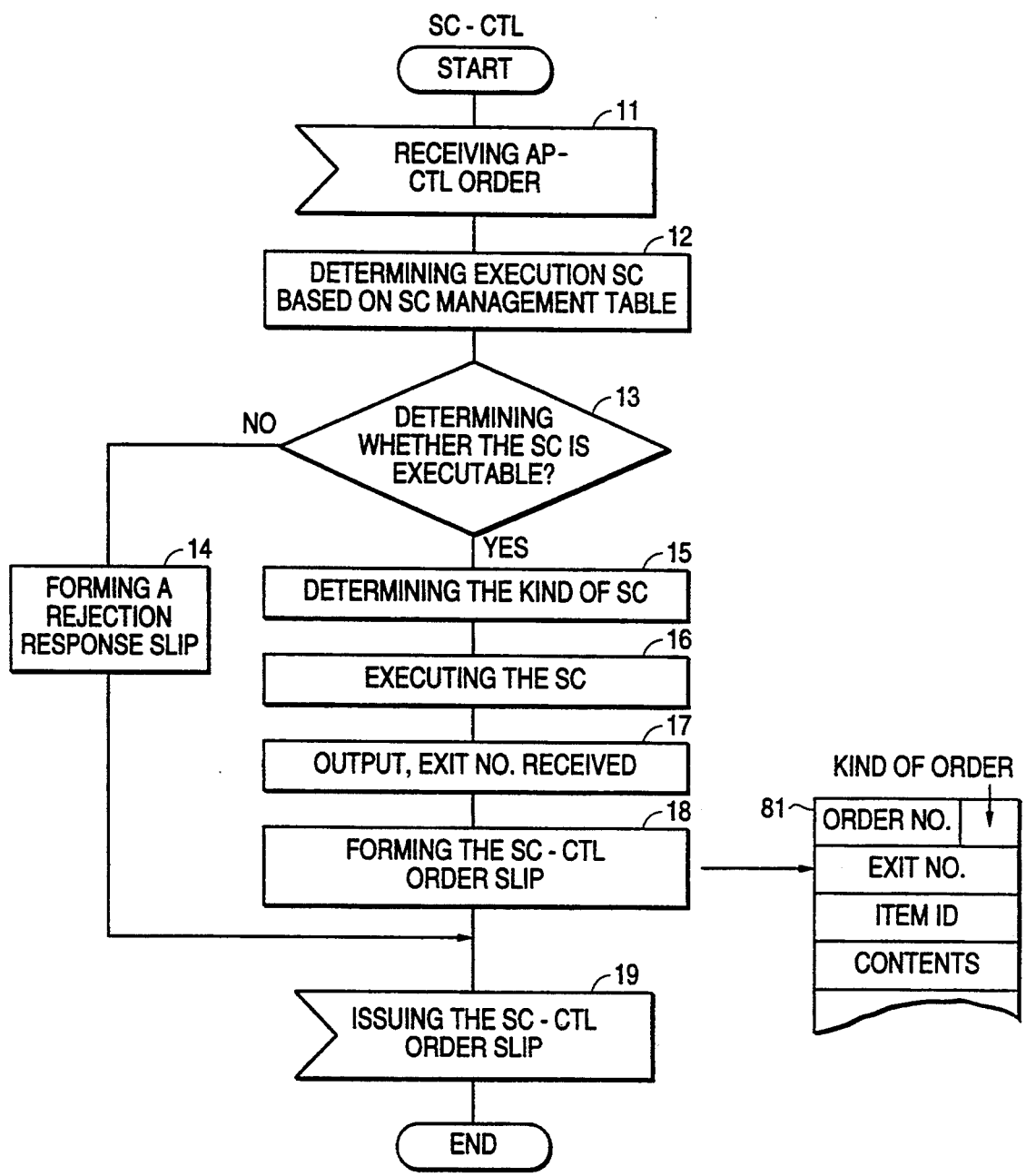
FIG. 7 shows a flow chart of an operation of SC-CTL.

FIG. 7 shows a flowchart of an operation of the SC-CTL 24. At step 11 it receives the AP-CTL order. Step 12 determines execution the SC based on the SC management table. At step 13 it is determined whether the SC is executable. When the SC is not executable, step 14 forms a rejection response slip. When the SC is executable, step 15 determines the kind of SC so that the kind of SC is used corresponding to the order kind used upon forming the SC-CTL order slip. Step 16 executes the SC. Step 17 receives the output and EXIT NO. Step 18 forms the SC-CTL order slip 81. Step 19 issues the SC-CTL order slip.

What is claimed is:

1. A communication service control system in an intelligent network having a service switching function (SSF), said communication service control system comprising:
    a service applicator storing specification data including a software component number indicating a type of service;
    SSF interface means for providing an interface between said service switching function and the communication service control system, the SSF interface means being connected to the service switching function through a communication line;
    application control means for obtaining, according to a service request received from the service switching function via said SSF interface means, the specification data including the software component number from said service applicator storing the specification data indicating the type of service; and
    software component control means for obtaining software component data, using the specification data obtained by said application control means, from a software component part connected to said software component control means, and then returning said software component data to said application control means.

2. A communication service control system in an intelligent network according to claim 1, wherein communication between said application control means and said software component control means is performed by transmitting a first order number indicating a process to be performed and a second order number containing necessary data.

3. A communication service control system in an intelligent network according to claim 1, wherein said SSF interface means is connected to the service switching function through said communication line, for interfacing with the service switching function using a common line signalling method.

4. A communication service control system in an intelligent network according to claim 1, wherein
    said application control means obtains, according to said service request received from said service switching function by said SSF interface means, the specification data including the software component number from said service applicator for storing the specification data indicating the type of service; and
    said application control means transmits service said service applicator indicating the type of service.

5. A communication service control system in an intelligent network according to claim 1, wherein
    said software component control means obtains said software component data corresponding to the specification data including the software component number specified by said application control means from said software component part and a restriction, and returns said specification data to said application control means; and
    said software component control means uses said software component number and the restriction for accessing said software component part.

6. A communication service control system in an intelligent network having a service switching function (SSF), said communication service control system comprising:
    a service applicator storing specification data including a software component number indicating a type of service;
    SSF interface means for providing an interface between said service switching function and the communication service control system, the SSF interface means being connected to the service switching function through a communication line;
    application control means for obtaining, according to a service request received from the service switching function via said SSF interface means, the specification data including the software component number from said service applicator storing the specification data indicating the type of service, wherein:
        said service request includes service keys,
        said service applicator comprises a table for identifying a service specification table for each of the service keys, and
        said service specification table stores the specification data containing sequential software component numbers; and
    software component control means for obtaining software component data, using the specification data obtained by said application control means, from a software component part connected to said software component control means, and then returning said software component data to set application control means.

7. A communication service control system in an intelligent network according to claim 6, wherein
    said software component control means comprises a software component management table for accessing said software component part; and
    said software component management table stores a flag indicating whether said software component management table restricts use of a particular software component part and stores data indicating whether the use of the type of service is permitted when the software component management table does not restrict completely the use of the particular software component part.

8. A communication service control system in a network having a service switching function, which issues a service request, the communication service control system comprising:
    interface means for receiving the service request from the service switching function;
    storage means for storing specification data including a software component number indicating a service type;
    control means, which receives the service request from interface means, for obtaining the specification data; and determining means for determining software component data for executing the service request based on specification data received from said storage means and for transmitting said software component data to the service switching function via said interface means.

9. A communication control system in a network, having a service switching function which issues a service request to provide a service, the communication service control system comprising:

component determining means for determining software component data based on the service request received from the service switching function;

usage determining means for determining usage restrictions based on said software component data received from said component determining means; and informing means for informing the service switching function of the software components received from said component determining means and said usage restrictions received from said usage determining means.

* * * * *

UNITED STATES PATENT AND TRADEMARK OFFICE
CERTIFICATE OF CORRECTION

PATENT NO. : 5,379,383
DATED : January 3, 1995
INVENTOR(S) : H. YUNOKI

It is certified that error appears in the above-indentified patent and that said Letters Patent is hereby corrected as shown below:

Column 1, line 8, delete "2." and insert --1.--

Column 4, line 6, delete "outputted" and insert --output--

Column 5, line 47, delete "shows" and insert --show--

Column 6, lines 2 and 10, delete "This" and insert --In this--

Column 6, line 27, delete "anti" and insert --and--

Column 6, line 48, delete "SC-CTL," and insert --SC-CTL--

UNITED STATES PATENT AND TRADEMARK OFFICE
CERTIFICATE OF CORRECTION

PATENT NO. : 5,379,383
DATED : January 3, 1995
INVENTOR(S) : H. YUNOKI

It is certified that error appears in the above-indentified patent and that said Letters Patent is hereby corrected as shown below:

Column 6, line 60, delete "x"

Column 10, line 65, after "service" insert --keys to--

Signed and Sealed this

Fourth Day of July, 1995

BRUCE LEHMAN

Attest:

Attesting Officer

Commissioner of Patents and Trademarks